United States Patent [19]

Rasmussen et al.

[11] 4,237,588
[45] Dec. 9, 1980

[54] CLAMP FOR PIPES OR THE LIKE

[75] Inventors: Jörgen Rasmussen, Hammersbach; Reiner Schreiter, Maintal, both of Fed. Rep. of Germany

[73] Assignee: Rasmussen GmbH, Maintal, Fed. Rep. of Germany

[21] Appl. No.: 1,263

[22] Filed: Jan. 5, 1979

[30] Foreign Application Priority Data

Jan. 10, 1978 [DE] Fed. Rep. of Germany ...... 2800824

[51] Int. Cl.³ .................. B65D 63/00; F16L 33/10
[52] U.S. Cl. .................. 24/274 R; 24/269; 24/274 WB
[58] Field of Search .......... 24/274 R, 274 P, 274 WB, 24/269

[56] References Cited

U.S. PATENT DOCUMENTS

| 3,087,220 | 4/1963 | Tinsley | 24/274 R |
| 3,195,204 | 7/1965 | McKown, Jr. | 24/274 R |
| 3,405,432 | 10/1968 | Scaravelli | 24/274 R |
| 3,528,142 | 9/1970 | Lodholm | 24/274 R |
| 3,924,308 | 12/1975 | Duprez | 24/274 R |
| 4,103,637 | 8/1978 | Luc | 24/274 R |

FOREIGN PATENT DOCUMENTS

| 865085 | 12/1952 | Fed. Rep. of Germany | 24/274 R |
| 1123889 | 10/1956 | France | 24/274 WB |
| 612631 | 11/1948 | United Kingdom | 24/274 R |
| 1112237 | 5/1968 | United Kingdom | 24/274 R |
| 1486154 | 9/1977 | United Kingdom | 24/274 R |

Primary Examiner—Victor N. Sakran
Attorney, Agent, or Firm—Peter K. Kontler

[57] ABSTRACT

A clamp for pipes or the like has a band whose width is constant save for two recesses in the marginal portions of one of its end portions which is received in the housing of the clamp. The bottom wall of the housing has projections which enter the recesses and the recesses are bounded by S-shaped lugs, at least at those ends which are nearer to the respective end of the band. Such lugs abut against the respective end face of the bottom wall of the housing to prevent extraction of the band when a threaded portion of the band meshes with a tightening screw which is mounted in the housing and can be rotated in a direction to reduce the size of the loop between the end portion and the threaded portion of the band.

18 Claims, 12 Drawing Figures

U.S. Patent  Dec. 9, 1980  Sheet 1 of 4  4,237,588
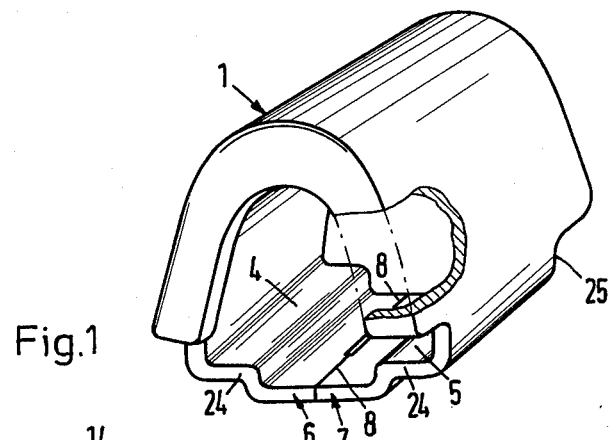
Fig.1
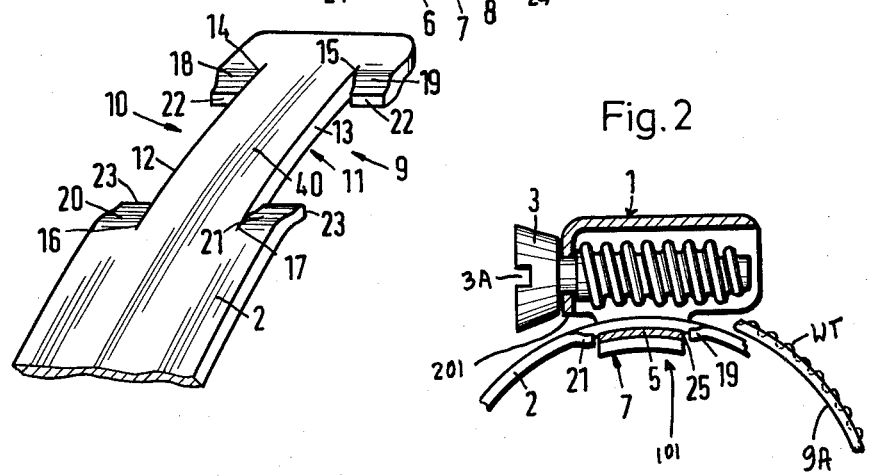
Fig.2
Fig.3
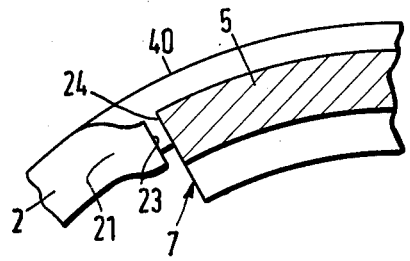

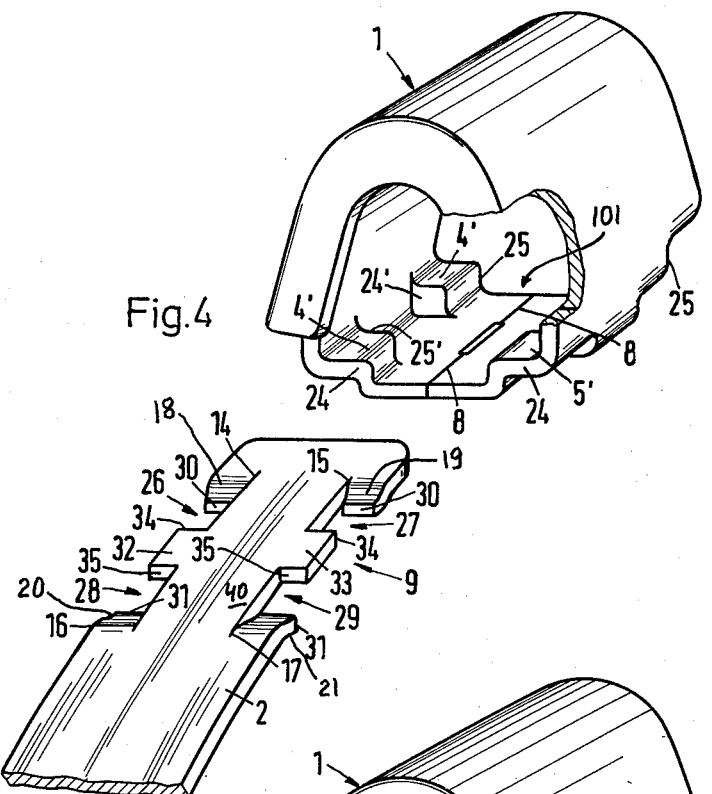
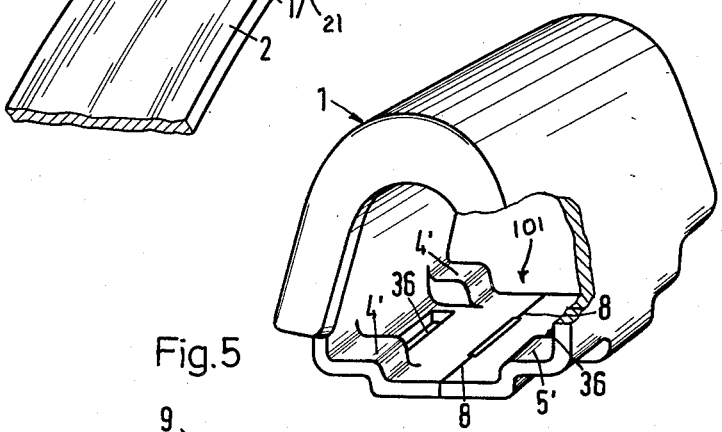
Fig.4
Fig.5
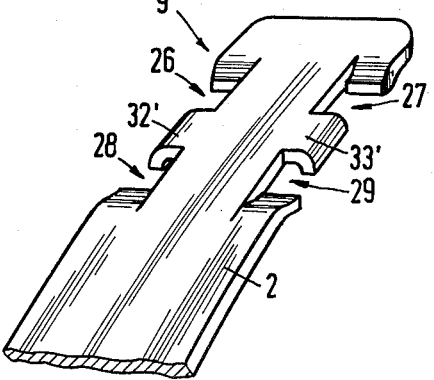
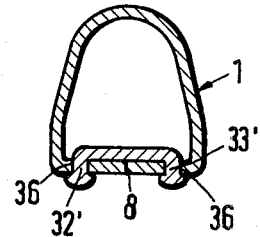
Fig.6

CLAMP FOR PIPES OR THE LIKE

BACKGROUND OF THE INVENTION

The present invention relates to clamps for pipes, cables, hoses and the like. More particularly, the invention relates to improvements in clamps or clips of the type wherein one end portion of a flexible band is anchored in a housing or bracket and the band has threads movable into mesh with an externally threaded rotary tightening element which is mounted in the housing.

It is already known to provide one end portion of the band which forms part of a clamp or clip with marginal recesses which receive portions of the housing to thus prevent extraction of the one end portion from the housing when the band is tightened around a pipe or the like. In many instances, the other end portion of the band and the tightening element mesh wormwise. When the tightening element is rotated in a direction to reduce the size of the loop which is formed by the band around an article or item to be clamped, the end faces of the recesses in the one end portion of the band bear against the adjacent surface of the housing with a force which increases proportionally with increasing tensional stress upon the band. In many instances, the width of the major portion of the band is less than the width of the one end portion. Therefore, such bands cannot be simply severed from a long web or strip of convoluted metallic or other material which is used for the manufacture of bands. In other words, the tool or tools for treatment of a blank of which a conventional band is made must sever the ends of the blank, provide the one end portion of the blank with the aforementioned recesses, and reduce the width of the major part of the blank. This contributes to higher cost of the band, not only because a substantial percentage of valuable material is lost due to trimming of the blank but also because the interval of time which is needed to convert a portion of a convoluted web or strip of metallic material into a finished band is relatively long. Also, the wear upon the tools which are used to sever and trim the blanks is very pronounced, especially since the material of a band which can stand pronounced stresses is hard to cut.

Another drawback of presently known clamps is that the band cannot be subjected to high or very high tensional stresses. In many instances, the laterally extending portions of the one end portion which is anchored in the housing bear against the housing with a force which is sufficiently pronounced to cause the projections to penetrate into and to cause the housing to open, i.e., they cause the housing to spread so that the one end portion of the band is extracted therefrom. The maximum permissible force which can be applied to tension the band is a function of the product of thickness of the band and of the adjacent housing wall. It was also observed that the aforementioned projections undergo pronounced deformation prior to entering the housing and causing expansion or total destruction of the housing with attendant abrupt termination of tightening action of the clamp.

It is further known to assemble a pipe clamp of a housing, a tightening screw and a band whose width is constant from end to end. That end portion of the band which is to be anchored in the housing has a centrally located rectangular slot which receives lugs projecting inwardly from the bottom wall of the housing. The extent to which the lugs project into the housing equals the thickness of the band. If the bottom wall of the housing is relatively thin, or if the band consists of a relatively thin strip stock, the retaining action of the lugs does not suffice to quarantee satisfactory retention of the slotted end portion of the band when the latter is subjected and pronounced tensional stresses. It has been observed, again and again, that the lugs are deformed or that the band breaks in the region of the slot.

In accordance with still another prior proposal, the one end portion of the band is formed with a tooth which extends from its inner side (i.e., toward the interior of the loop which is formed when the band is placed around a pipe or the like) and abuts against an end face of the bottom wall of the housing. Such connections are unreliable because the band is likely to be detached from the housing as soon as the tensional stress is relaxed. Furthermore, such connections also exhibit the drawback that the tooth is likely to be drawn into the housing in response to the application of a pronounced tensional stress upon the band.

OBJECTS AND SUMMARY OF THE INVENTION

An object of the invention is to provide a novel and improved clamp or clip which is constructed and assembled in such a way that the band can stand pronounced tensional stresses and that such stresses cannot result in damage to the housing and/or in extraction of the one end portion of the band from the housing.

Another object of the invention is to provide a novel and improved separable or permanent connection between one end portion of the band and the housing of a clamp for pipes, hoses or the like.

A further object of the invention is to provide a novel and improved band for use in a clamp of the above outlined character.

An additional object of the invention is to provide a novel and improved housing for use with the aforementioned band.

An ancillary object of the invention is to provide a clamp whose band can be mass produced at a reasonable cost and within a fraction of the time which is needed for the manufacture of conventional bands.

Another object of the invention is to provide a band which, rather than tending to expand the housing, contributes to prevention of expansion of the housing in response to the application of pronounced tensional stresses thereto.

A further object of the invention is to provide a band which can be used with a relatively simple, lightweight and inexpensive housing.

The invention resides in the provision of a clamp for pipes or the like which comprises a housing, an externally threaded tightening element rotatably mounted in the housing, and an elongated flexible band including an end portion in the housing and a second portion which is remote from the end portion and is threaded so that it can be placed into mesh with the tightening element for the purpose of changing the size of the loop which is formed by the band between the end portion and the second portion. The band has a constant width and its end portion has an outer side, an inner side, marginal recesses disposed opposite each other as considered transversely of the band, and a lug located at one end of each of the recesses as considered in the longitudinal direction of the band. Such lugs extend beyond the inner side of the end portion and the housing includes a wall provided with projections extending into the recesses. The wall has an end face adjacent to the lugs which are caused to bear against the end face when the tightening element is rotated in a direction to tension the band, e.g., while the band surrounds a portion of a pipe, cable or the like.

The projections preferably constitute outwardly bent portions of the aforementioned wall; they are preferably immediately adjacent to the end face of the wall and may but need not extend along the full length of the wall, as considered in the longitudinal direction of the band. The end portion may be provided with two additional lugs disposed at the opposite ends of the respective recesses and adjacent to the other end face of the wall of the housing.

The lugs are preferably S-shaped, and the end portion of the band may but need not be provided with slits which are inwardly adjacent to the lugs. If the end portion of the band has slits, such slits are preferably flush with the bottom surfaces of the respective recesses. These recesses are preferably but need not be rectangular.

The novel features which are considered as characteristic of the invention are set forth in particular in the appended claims. The improved clamp itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary exploded perspective view of a clamp which embodies one form of the invention;

FIG. 2 is a smaller-scale central longitudinal sectional view of the housing and an elevational view of the tightening element and of both end portions of the band in the clamp of FIG. 1;

FIG. 3 is an enlarged view of a detail of FIG. 2;

FIG. 4 is a fragmentary exploded perspective view of a second clamp having a modified housing and a modified band;

FIG. 5 is a similar fragmentary exploded perspective view of a third clamp with a housing and band which constitute modifications of the corresponding parts shown in FIG. 4;

FIG. 6 is a smaller scale transverse sectional view of the housing and of one end portion of the band shown in FIG. 5;

DESCRIPTION OF THE PREFERRED EMBODIMENTS

Figure 7:
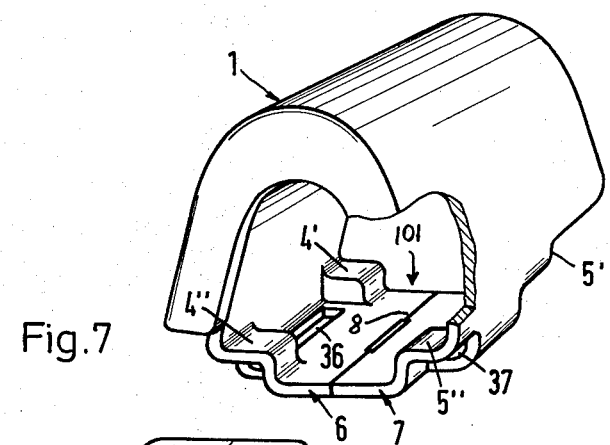
FIG. 7 is a fragmentary exploded perspective view of a fourth clamp, with the tightening element omitted.

FIGS. 1 to 3 show a clamp or clip which comprises a housing 1, a rotary tightening element or screw 3 and an elongated flexible band 2 of constant width. The outer side of the band portion 9A has worn threads WT which mate with the external threads of the element 3 when the clamp is assembled in a manner as shown in FIG. 2. By rotating the tightening element 3 with respect to the housing 1 (e.g., by resorting to a screwdriver which fits into the transverse slot 3A of the element 3), one can increase or reduce the size of the loop which is formed by the band 2 between the portion 9A and an end portion 9.

In accordance with a feature of the invention, the housing 1 has a bottom wall or inner wall 101 which is bent so as to form a substantially trough-shaped body including a substantially flat central portion and two side panels or portions which extend upwardly therefrom (as viewed in FIG. 1) so as to define two pairs of end faces 24 and 25 at the opposite ends of the housing 1. The central portion is formed by two coplanar marginal portions 6, 7 which are welded to each other by a seam 8 extending lengthwise of the housing 1. Those parts or portions or panels of the marginal portions 7, 8 which extend upwardly from the central portion are shown at 4 and 5; they constitute projections which are received in two marginal recesses 10, 11 of the end portion 9 of the band 2 when such end portion is properly inserted into and anchored in the housing 1.

The end portion 9 of the band 2 need not be provided with threads because it does not move into the range of threads on the tightening element 3. The recesses 10, 11 are respectively bounded by lugs 18, 20 and 19, 21 which are disposed at the ends of the respective recesses, as considered in the longitudinal direction of the band 2. The end faces 22 of the lugs 18, 19 abut against the end faces 25 of the projections 4, 5 at one end of the wall 101 when the end portion 9 is properly inserted into the housing 1 in a manner as shown in FIG. 2, and the end faces 23 of lugs 20, 21 then abut against the end faces 24 of the projections 4, 5 at the other end of the housing 1. Thus, the lugs 18, 19 are then located at one end, and the lugs 20, 21 are located at the other end of the seam 8. The end faces 22, 23 engage the respective end faces 24, 25 and thus hold the band 2 against lengthwise movement as long as the projections 4 and 5 are received in the respective recesses 10, 11.

The recesses 10, 11 are mirror symmetrical to each other with reference to the central longitundinal symmetry plane of the band 2 (i.e., they are located opposite each other as considered transversely of the band), and the projections 4, 5 are mirror symmetrical to each other with reference to the plane which includes the seam 8. Save for the narrower neck portion or web 40 between the recesses 10 and 11, the width of the band 2 is constant from end to end. Thus, the band 2 can be obtained by severing, at regular intervals, an elongated strip or tape of convoluted metallic or plastic material which is provided with spaced-apart threads WT in the region of the band portion 9A.

The end portion 9 of the band 2 is formed with slits 15, 17 which are coplanar with the bottom surface 13 of the recess 11 and are inwardly adjacent to the lugs 19, 21. The end portion 9 is further provided with slits 14, 16 which are coplanar with the bottom face 12 of the recess 10 and are adjacent to the inner sides of the lugs 18, 20. The slits 14 to 17 enhance the flexibility of the respective lugs 18–21.

The width of web 40 between the recesses 10, 11 preferably slightly exceeds the distance between the projections 4, 5 in the bottom wall 101 of the housing 1. The length of each recess, as considered in the longitudinal direction of the band 2, equals or only slightly exceeds the distance between the end faces 24, 25 of the projection 4 or 5. Thus, when the web 40 is inserted into the housing 1, it is wedged between the projections 4 and 5 in a manner as shown in FIG. 2. The end portion 9 can be inserted into the housing 1 prior to making of the welded seam 8. The innate resiliency of the material of the housing 1 tends to move the marginal portions 6 and 7 toward each other so that the projections 4 and 5 respectively bear against the bottom surfaces 12 and 13 before the housing is closed by forming the welded seam 8. Such construction of the housing 1, and such sequence of inserting the end portion 9 and forming the seam 8 insure that the housing 1 need not be held in special vises or other devices in order to insure that it properly retains and orients the web 40.

The projections 4 and 5 are bent out of the material of the bottom wall 101 of the housing 1 and therefore contribute to rigidity of the fully assembled housing. The depth of depression between the projections 4, 5 and the inner side of the central portion of the bottom wall 101 of the housing 1 equals or approximates the thickness of the web 40, i.e., the thickness of the band 2.

The curvature of junctions between the projections 4, 5 and the central portion of the bottom wall 101 of the housing 1, as well as the seam 8, would be likely to prevent full insertion of the web 40 into the aforementioned depression. In other words, such junctions and the seam 8 could prevent surface-to-surface abutment between the inner side of the web 40 and the adjacent inner surface of the central portion of the bottom wall 101. Unintentional or accidental removal of the end portion 9 from the housing 1 is prevented by the lugs 18–21 which, when the band 2 is assembled with the housing 1, are adjacent to the end faces 24 and 25 of the projections 4 and 5. The lugs are substantially S-shaped and their free end portions extend beyond the inner side of the end portion 9 so that their end faces 22 and 23 are located opposite the respective end faces 24 and 25 even if the web 40 does not extend into the deepmost portion of the aforementioned depression between the projections 4 and 5. When the band 2 is tensioned by the tightening element 3, the end faces 22 lie flush against the respective end faces 25 to thus prevent any movement of the end portion 9 toward the interior of the housing 1.

The manner in which the tightening element 3 is rotatably mounted in an end wall 201 of the housing 1 is shown in FIG. 2.

An important advantage of the improved clamp is that the band 2 (with the sole exception of the web 40) has a constant width which corresponds to the width of the tape or web of which the band is made. Furthermore, the projections 4 and 5 of the bottom wall 101 constitute suitably deformed parts of such bottom wall so that they reinforce the bottom wall while simultaneously extending into the respective recesses 10 and 11 to hold the end portion 9 against extraction from the housing when the tightening element 3 is rotated in a direction to subject the band 2 to a tensional stress as a result of application of the band around a pipe, cable or the like. The projections 4 and 5 of the bottom wall 101 are bent outwardly and the lugs 18–21 of the end portion 9 are bent inwardly, i.e., toward the concave side of the band when the latter is looped around one or more objects. Portions of the projections 4, 5 extend substantially at right angles to the central portion of the bottom wall 101.

The making of recesses 10 and 11 involves removal of relatively small portions of the band 2 so that the band can be mass-produced with substantial savings in expensive material of the web or strip of which the band is made. Also, the end faces 24 and 25 of the projections 4 and 5 are relatively large so that the end faces 22 of the lugs 18 and 19 can move into full surface-to-surface contact with the respective end faces 25. This reduces the likelihood of generation of highly localized stresses which could result in damage to or destruction of the band 2 and/or housing 1. More particularly, the lugs 18 and 19 are not likely to be deformed so that they could enter into the housing 1 and expand the latter, for example, by causing the seam 8 to yield and to permit opening up of the bottom wall 101 between the marginal portions 6 and 7.

The end faces 24 and 25 of the projections 4 and 5 are located in planes which are normal or practically normal to the longitudinal direction of the housing 1. Therefore, such end faces can be properly engaged by the end faces of lugs which are relatively thin, i.e., the end portion 9 can properly engage the bottom wall 101 even if the material of the end portion 9 is thin or very thin. This applies even if, as a result of the application of a pronounced tensional stress, the end portion 9 exhibits the tendency to slide outwardly and away from the bottom wall 101, i.e., if the lugs 18 and 19 tend to move upwardly, as viewed in FIG. 2. The same holds true when the web 40 is not fully received in the depression above the central portion of the bottom wall 101, either because the thickness of the web 40 exceeds the height of the projections 4 and 5 or because the welded seam 8 extends outwardly beyond the central portion of the bottom wall 101.

The projections 4 and 5 preferably extend all the way between the ends of the bottom wall 101. This insures that the end faces 22 of the lugs 18, 19 can engage the end faces 25 of the projections 4 and 5 and/or the neighboring portions of the end faces of the bottom wall 101.

Substantially S-shaped lugs are preferred at this time because the free end portions of these lugs can be readily oriented in such a way that their end faces lie flush against the respective end faces of the projections 4 and 5 (and/or the adjacent end faces of the remaining portions of the bottom wall 101). As mentioned above, a substantial surface-to-surface contact between the lugs and the bottom wall 101 is desirable because this reduces the likelihood of localized stressing of the end portion 9 and/or bottom wall 101. The purpose of the slits 14–17 is to facilitate the making and deformation of lugs 18–21 in the aforedescribed manner so that the end faces of the lugs lie flush against the respective end faces of the projections 4 and 5. The recesses 10 and 11 of the end portion 9 are substantially square or rectangular.

In the embodiment of FIG. 4, the end portion 9 of the band 2 has two composite recesses which include two spaced apart sections 26, 28 at one side and two spaced apart sections 27, 29 at the other side of the web 40. The sections 26, 28 are separated from each other by a protuberance 32 which is mirror symmetrical to a protuberance 33 between the sections 27 and 29. The lugs 18, 19 have end faces 30 facing the sections 26, 27, and the lugs 20, 21 have end faces 31 facing the sections 28, 29. The protuberances 32, 33 have end faces 34 facing the sections 26, 27, and end faces 35 facing the sections 28, 29. The lugs 18–21 are formed in the same way as in the end portion 9 of FIG. 1, i.e., their inner sides are adjacent to slits 14–17 which are coplanar with the bottom surfaces in the respective sections 26–29. There are no lugs on the protuberances 32 and 33.

The bottom wall 101 of the housing 1 of FIG. 4 has two interrupted projections 4' and 5' which respectively define sockets for the corresponding protuberances 32 and 33. When the tightening element (not shown in FIG. 4) is rotated in a direction to reduce the size of the loop which is defined by the band 2, the end faces 30 of the lugs 18, 19 engage the end faces 25 of the projections 4', 5', and the end faces 35 of the protuberances 32, 33 thereupon engage the end faces 25' of the front halves of the projections 4', 5', as viewed in FIG. 4. The bottom wall 101 of the housing 1 is curved (see FIG. 2) so as to conform to the curvature of the properly inserted end portion 9. The combined width of the web 4 an protuberances 32, 33 may be slightly less than the width of the major portion of the band 2 to thus insure that the protuberances 32, 33 can readily enter the sockets between the halves of the projections 4' and 5'. Moreover, this reduces the stiffness of the protuberances 32, 33 so that they can be readily deformed in order to insure that their curvature conforms to the curvature of the bottom wall 101 of the housing 1. The protuberances 32 and 33 provide additional end faces to thus insure even more satisfactory anchoring of the end portion 9 in the housing 1. Moreover, the protuberances 32, 33 reduce the likelihood of misorientation (especially tilting) of the housing 1 when the band 2 is tensioned by rotating the tightening element in a direction to reduce the size of the loop which is formed by the band 2 between its two end portions.

The reference character 24' denotes an end face of one-half of the projection 4'. This end face is adjacent to the end face 34 of the protuberance 32 when the end portion 9 is properly inserted into the housing 1.

An advantage of the clamp of FIG. 4 is that the number of abutting end faces on the end portion 9 and bottom wall 101 is doubled. Thus, when the band 2 is under tension, the end faces 30 of the lugs 18, 19 engage the end faces 25 of the rear halves of the projections 4' and 5', as viewed in FIG. 4, and the end faces 35 of the protuberances 32, 33 engage the rear end faces of the front halves of the projections 4' and 5'. This further reduces the likelihood of extraction of the end portion 9 from the housing 1 when the band 2 is subjected to pronounced tensional stresses. Moreover, such configuration of the end portion 9 further reduces the likelihood of highly localized stresses upon the band 2 and/or housing 1. Moreover, the protuberances 32 and 33 reduce the likelihood of undesirable changes in orientation (particularly turning) of the end portion 9 with repsect to the housing when the tensioning element 3 is rotated in a direction to apply a pronounced tensional stress to the band 2.

The recesses in the end portion 9 and/or the projections of the bottom wall 101 can be dimensioned in such a way that the web 40 is received in the depression of the bottom wall 101 with at least some play when the band 2 is not subjected to tensional stresses. This is shown in FIGS. 2 and 3. With reference to FIG. 4, it is presently preferred to select the dimensions of the bottom wall 101 and end portion 9 in such a way that the end faces 30 of the lugs 18 and 19 engage the end faces 25 of the rear halves of projections 4' and 5' before the end faces 35 of the protuberances 32 and 33 engage the corresponding end faces of the front halves of projections 4' and 5'. This is especially desirable if the protuberances 32 and 33 are relatively small so that they are more likely to be deformed than the lugs 18 and 19.

However, and as explained above, it is also within the purview of the invention to insert the web 40 prior to making of the seam 8 so that the end portion 9 of the band 2 is more or less permanently anchored in the housing 1 and cannot be detached (or cannot be readily detached) even when the band 2 is not subjected to any tensional stresses. This modification exhibits the advantage that the end portion 9 can support the housing 1 during welding of the seam 8.

The embodiment of FIGS. 5 and 6 is similar to the embodiment of FIG. 4, except that the outermost portions or outer end portions of the protuberances 32' and 33' are bent inwardly and enter the slots 36 of the bottom wall 101 of the housing 1 when the end portion 9 of the band 2 is properly inserted into and coupled to the housing. One of the slots 36 is provided in the bottom wall of the housing 1 between the two halves of the projection 4', and the other slot 36 is provided between the two halves of the projection 5'.

The length of the inwardly bent outer end portions of the protuberances 32' and 33' is preferably selected in such a way that they extend inwardly and beyond the inner side of the bottom wall 101 of the housing 1 (see FIG. 6). The projecting part of the inwardly bent end portions of protuberances 32' and 33' are then upset in a manner as shown in FIG. 6 so as to insure that the band 2 is more or less permanently coupled to the housing 1. The clamp of FIGS. 5 and 6 exhibits the advantage that the protuberances 32', 33' can take up substantial stresses acting in the longitudinal direction of the band 2 as well as that such protuberance reduce the likelihood of transmission of substantial stresses to the seam 8 so that the latter remains intact even if the housing 1 is subjected to very pronounced deforming stresses. In face, it has been found that, when the bent-over outer end portions of the protuberances 32', 33' are upset in a manner as shown in FIG. 6 (or soldered or welded to the bottom wall 101 of the housing 1), the seam 8 can be dispensed with.

Figure 8:
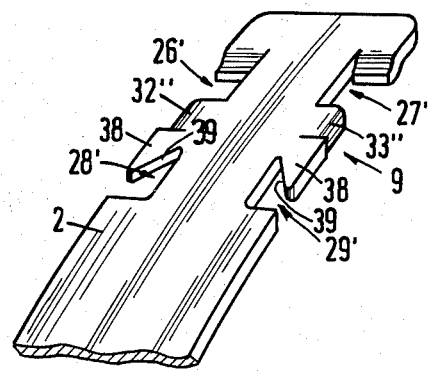
FIG. 8 is a plan view of the one end portion of the band in the clamp of FIG. 7.
Figure 8:
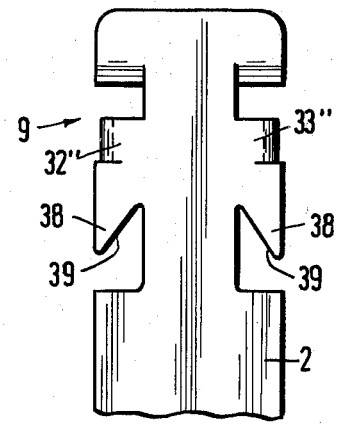

The embodiment of FIGS. 7 and 8 differs from the embodiment of FIGS. 5 and 6 that the front halves 4" and 5" of the projections 4' and 5' are more pronounced than the rear halves of these projections. The bottom wall 101 has slots 36 for reception of protuberances 32", 33" on the end portion 9 of the band 2. Furthermore, the front halves 4" and 5" have holes 37 for reception of conical tips of auxiliary protuberances 38 which are adjacent to the protuberances 32", 33". It can be said that the end portion 9 of the band 2 which is shown in FIGS. 7 and 8 has two pairs of protuberances. One protuberance of each pair (namely, the part 32" or 33") extends into the respective socket 36 and the other protuberance of each pair (namely, the part 38) extends into the respective hole 37. The protuberances 38 extend rearwardly into the corresponding sections 28', 29' of the respective composite recesses in the end portion 9. The length of the protuberances 32", 33" is somewhat less than the length of the corresponding slots 36 in order to allow for introduction of the tips of auxiliary protuberances 38 into the corresponding holes 37. The inclined inner surfaces 39 of the protuberances 38 serve to direct certain forces inwardly toward the seam 8 of the bottom wall 101 of the housing 1 to thereby reduce the stresses upon the seam. Thus, as the pull upon the band 2 increases, the auxiliary protuberances 38 transmit a greater force in a direction to prevent spreading of the bottom wall 101 of the housing.

Figure 9:
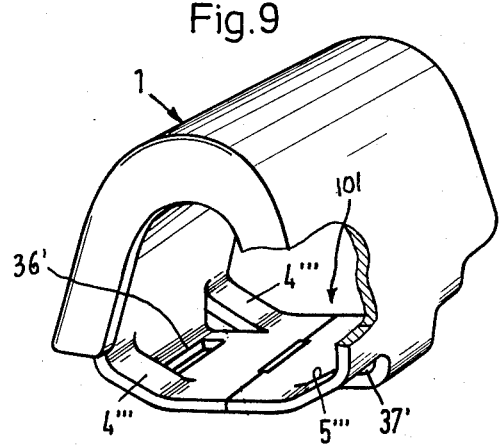
FIG. 9 is a fragmentary perspective view of a modified housing which can be utilized in the clamp of FIG. 7.

FIG. 9 shows a modified housing 1 wherein the L-shaped projections (such as 4 and 5) are replaced by outwardly sloping two-piece projections 4''' and 5'''. These projections make an oblique angle with the central portion of the bottom wall and have sockets 36' for the parts 32'', 33'' (not shown in FIG. 9) and holes 37' for the tips of auxiliary projections 38 on the end portion of the band 2 which is identical with the band of FIGS. 7 and 8. An advantage of the housing 1 of FIG. 9 is that its manufacturing cost is less than that of the housing which is illustrated in FIG. 7. Thus, the deforming forces which are needed to form the projections 4''' and 5''' in the bottom wall 101 are less pronounced than those which must be applied to form the projections 4'' and 5''.

The previously described embodiments of the housing 1 exhibit the advantage that they present larger end faces for engagement with the lugs and/or protuberances of the end portion 9. On the other hand, the housing of FIG. 9 can be manufactured at a lower cost and by resorting to simpler deforming equipment for the bottom wall 101.

Figure 10:
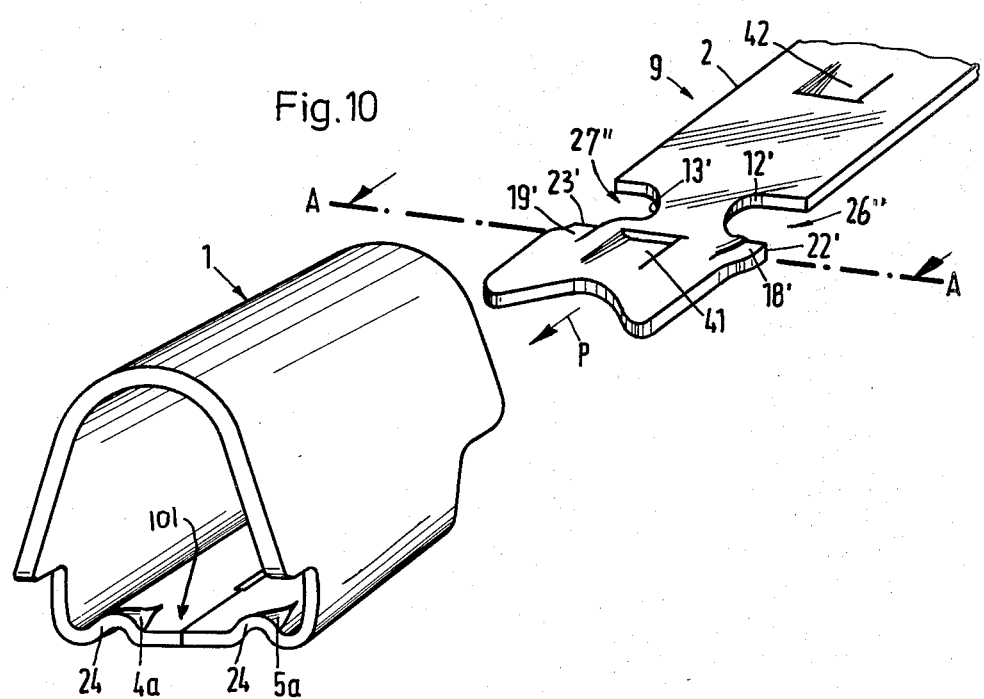
FIG. 10 is a fragmentary exploded perspective view of still another clamp, with the tightening element omitted.
Figure 11:
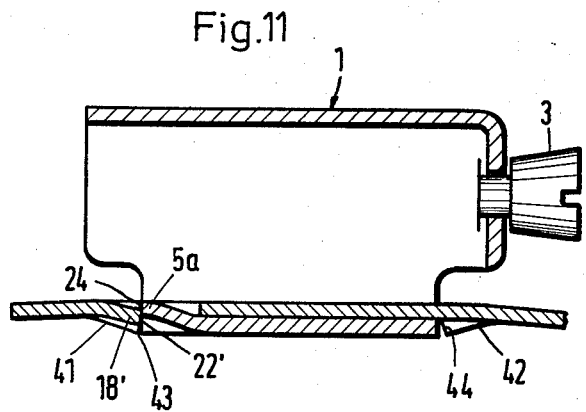
FIG. 11 is a central longitudinal sectional view of the housing and of both end portions of the band in the clamp of FIG. 10.
Figure 12:
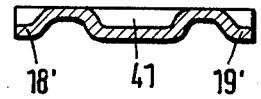
FIG. 12 is a sectional view of the one end portion of the band as seen in the direction of arrows from the line A—A of FIG. 10.

In the embodiment of FIGS. 10 to 12, the projections 4a, 5a in the bottom wall 101 of the housing 1 are relatively short, i.e., they are adjacent to one longitudinal end of the housing. The end portion 9 of the band 2 is introduced in the direction which is indicated by the arrow P. The projections 4a, 5a are provided at that end of the housing 1 which is remote from the slotted head of the tightening element 3. The flat end faces 22', 23' of lugs 18', 19' abut against the end faces 24 of projections 4a, 5a when the end portion 9 is properly inserted in the housing 1. The surfaces bounding the recesses 26'', 27'' of the end portion 9 merge gradually, at a constant curvature, into the end faces 22', 23, i.e., the transition from the end faces 22', 23' into the bottom surfaces 12', 13' of the recesses 26'' and 27'' is gradual. This prevents the generation of highly pronounced localized stresses in the end portion 9. The slits between the lugs 18', 19' and the adjacent parts of the end portion 9 are omitted. By resorting to a suitable deforming tool, the lugs 18', 19' can be confirmed in such a way that they exhibit a substantially S-shaped outline which insures a large area of contact between the end faces 22', 23' and the respective end faces 24 of projections 4a, 5a on the housing 1.

The end portion 9 is further formed with two centrally located wedge-like auxiliary lugs 41 and 42. The end face 43 of the lug 41 abuts against the adjacent end face of the bottom wall 101 of the housing 1 (between the projections 4a, 5a) when the end portion 9 is properly inserted, and the end face 44 of the lug 42 is adjacent to the other end face of the bottom wall 101 of the housing (see FIG. 11). The centrally located auxiliary lugs 41, 42 enhance the engagement between the clamp and the part (e.g., a pipe or a cable) which is surrounded by the band 2 by preventing the formation of cavities or dead corners at both ends of the bottom wall 101 of the housing 1. Similar centrally located lugs can be provided on the bands 2 of the previously described embodiments of the improved clamp.

The housing 1 and the band 2 may consist of zinc-coated steel. Alternatively, these parts may consist of stainless steel. Still further, one of the parts 1, 2 may consist of zinc-coated steel and the other of stainless steel.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

We claim:

1. A clamp for pipes or the like, comprising a circumferentially complete housing; an externally threaded tightening element rotatably mounted in said housing; and an elongated band including an end portion in said housing and a threaded second portion remote from said end portion and movable into mesh with said element so that the band forms a loop between said portions thereof, said band having a constant width and said end portion having an outer side, an inner side facing said loop when said second portion meshes with said element, marginal recesses disposed opposite each other as considered transversely of said band, and a lug located at one end of each of said recesses as considered in the longitudinal direction of said band and having an end face extending beyond said inner side, said housing including a wall which is adjacent to said inner side and said wall haivng projections extending into said recesses and an end face adjacent to the end faces of said lugs, said end face of said wall being immediately adjacent to said projections.

2. A clamp as defined in claim 1, wherein said projections constitute outwardly bent portions of said wall.

3. A clamp as defined in claim 1, wherein said lugs are substantially S-shaped.

4. A clamp as defined in claim 1, wherein said end portion has slits inwardly adjacent to said lugs.

5. A clamp as defined in claim 4, wherein said recesses have a substantially rectangular outline and include bottom surfaces flush with said slits.

6. A clamp as defined in claim 1, wherein said end portion includes a web between said recesses and said web is wedged between said projections.

7. A clamp as defined in claim 1, wherein said wall includes a central portion between said projections and said projections include portions extending substantially at right angles to said central portion.

8. A clamp as defined in claim 1, wherein said wall includes a central portion between said projections and each of said projections makes an oblique angle with said central portion.

9. A clamp as defined in claim 1, wherein said projections are adjacent to said end face of said wall and the length of said projections is a small fraction of the length of said wall, as considered in the longitudinal direction of said band.

10. A clamp as defined in claim 1, wherein said end portion has surfaces bounding said recesses and merging gradually into the end faces of the respective lugs.

11. A clamp as defined in claim 1, wherein said wall has a second end face and said end portion further comprises two auxiliary lugs each adjacent to a different one of said end faces of said wall.

12. A clamp as defined in claim 11, wherein said auxiliary lugs are wedges extending beyond said inner side and located at the opposite ends of said recesses, said auxiliary lugs being disposed substantially centrally of said end portion.

13. a clamp for pipes or the like, comprising a housing; an externally threaded tightening element rotatably mounted in said housing; and an elongated band including an end portion in said housing and a threaded second portion remote from said end portion and movable into mesh with said element so that the band forms a loop between said portions thereof, said band having a constant width and said end portion having an outer side, an inner side facing said loop when said second portion meshes with said element, marginal recesses disposed opposite each other as considered transversely of said band, and a lug located at one end of each of said recesses as considered in the longitudinal direction of said band and extending beyond said inner side, each of said recesses comprising two sections and said end portion further comprising a protuberance between the sections of each of said recesses, said housing including a wall which is adjacent to said inner side and said wall having projections extending into said recesses and an end face adjacent to said lugs.

14. A clamp as defined in claim 13, wherein each of said projections has a socket for the respective protuberance.

15. A clamp as defined in claim 14, wherein said projections include spaced apart portions which extend into the sections of the respective recesses with at least some clearance in untensioned condition of said band.

16. A clamp as defined in claim 14, wherein each of said protuberances has an inwardly bent outer end portion and said wall has slots for the end portions of said protuberances.

17. A clamp as defined in claim 16, wherein said end portions of said protuberances extend through and beyond said slots and are upset at the exterior of said wall.

18. A clamp for pipes or the like, comprising a housing; an externally threaded tightening element rotatably mounted in said housing; and an elongated band including an end portion in said housing and a threaded second portion remote from said end portion and movable into mesh with said element so that the band forms a loop between said portions thereof, said band having a constant width and said end portion having an outer side, an inner side facing said loop when said second portion meshes with said element, marginal recesses disposed opposite each other as considered transversely of said band, a lug located at one end of each of said recesses as considered in the longitudinal direction of said band and extending beyond said inner side, and wedge-like protuberances in said recesses, said protuberances having tips extending into holes provided therefor in the respective projections and said protuberances extending in a direction away from said lugs, said housing including a wall which is adjacent to said inner side and said wall having projections extending into said recesses and an end face adjacent to said lugs.

* * * * *